United States Patent [19]

Green et al.

[11] Patent Number: 5,016,314
[45] Date of Patent: May 21, 1991

[54] ASBESTOS-CONTAINING MATERIALS REMOVAL ASSEMBLY

[75] Inventors: Dennis H. Green, Arvada; Stephen C. Johnson, Lakewood, both of, CO

[73] Assignee: EnviRestore Technologies, Inc., Lakewood, Colo.

[21] Appl. No.: 413,858

[22] Filed: Sep. 28, 1989

[51] Int. Cl.⁵ .............................................. B08B 7/04
[52] U.S. Cl. ........................................ 15/320; 15/321; 98/115.4; 134/200; 134/201; 277/3; 277/53
[58] Field of Search .................. 15/321, 322, 345, 346, 15/320; 55/355, 385.2; 98/115.4; 134/200, 201; 277/3, 53

[56] References Cited

U.S. PATENT DOCUMENTS

| 3,461,478 | 8/1969 | Taylor | 15/346 X |
| 3,775,053 | 11/1973 | Wisdom | 15/322 X |
| 4,765,352 | 8/1988 | Strieter | 134/99 |
| 4,774,974 | 10/1988 | Teter | 134/110 |
| 4,817,644 | 4/1989 | Green | 134/6 |
| 4,872,920 | 10/1989 | Flynn et al. | 15/321 X |
| 4,897,121 | 1/1990 | Sasaki | 134/34 X |
| 4,911,191 | 3/1990 | Bain | 134/201 X |

Primary Examiner—Philip R. Coe
Attorney, Agent, or Firm—Bruce G. Klaas; William P. O'Meara

[57] ABSTRACT

An ACM removal assembly is disclosed, including: a nozzle for directing a pressurized fluid against ACM for dislodging the ACM; a fluid supply reservoir connected to the nozzle; a housing which supports the nozzle and capturingly receives spent fluid and dislodged ACM; and a material handing and separating system which includes coarse separating apparatus for coarsely separating the spent fluid from the dislodged ACM and fluid return conduit for returning coarsely separated fluid to the fluid supply reservoir. Also disclosed is a method for removing ACM from a building structure, including: sealingly circumscribing a small-area building region having exposed ACM with an ACM containment apparatus; removing ACM from the circumscribed building region with a fluid spray blast; combiningly capturing dislodged ACM and spent fluid from the spray blast in the containment apparatus; coarsely separating a portion of the ACM from the combined ACM and spent fluid; and reusing the coarsely separated fluid to remove ACM from the building.

12 Claims, 3 Drawing Sheets

ASBESTOS-CONTAINING MATERIALS REMOVAL ASSEMBLY

BACKGROUND OF THE INVENTION

The present invention relates to a system for removing asbestos-containing materials (ACM) from buildings.

Since before the second World War through the early 1970's, as much as 300 million tons of asbestos mineral had been used in building construction in the United States. By the early 1970's, medical evidence began to establish that asbestos exposure can cause severe and irreversible lung damage and various forms of cancer. By the early 1980's, public concern over the hazards associated with asbestos became manifest in legislation which (1) limited the use of asbestos in new construction; (2) specified procedures for asbestos removal in buildings; (3) required removal of asbestos-containing materials prior to building remodeling or demolition; (4) required management of asbestos in schools.

The U.S. Environmental Protection Agency has estimated that about 45,000 schools and 73,000 public and commercial buildings contain some form of asbestos-containing materials (ACM). These ACMs are typically (1) surfacing materials sprayed or troweled onto ceilings and walls; (2) thermal insulation on pipes, ducts, boilers and tanks; (3) miscellaneous materials such as ceiling and floor tile and wallboards.

ACM removal is currently a heavily labor-intensive industry. Typically, surface ACM is removed by laborers using paint scrapers. The ACM is initially hand-wetted using sponges, low pressure water spray or the like, in order to reduce the amount of asbestos dust created during scraping. Thereafter, the ACM is scraped from its location in the building and allowed to fall to the building floor. Next, the dislodged ACM is shoveled up manually and placed in plastic bags. After the initial scraping of building surfaces with paint scrapers and the like, a final cleanup process is initiated to remove ACM from joints, crevices, beams, and other hard-to-reach areas in which large paint scrapers and the like are unsuitable. This cleanup process sometimes includes using pressurized water to blast the remaining ACM from its location on the building structure. Thereafter, all ACM, water, and other debris on the floor of the building is removed, typically by wet/dry vacuum units such as the type used in most shop and maintenance areas. As a final step, all surfaces of the building and enclosure are wiped down to remove any remaining ACM dust, etc.

Although regulations for asbestos removal vary from state to state, typically the area from which ACM is to be abated is required to be sealed off from the surrounding environment to prevent discharge of airborne asbestos fibers into the surrounding environment. During any period in which ACM removal is taking place, the sealed-off area within the building enclosure is required to remain at a negative air pressure with respect to the surrounding environment. The negative air pressure is typically provided by a "hepafiltered" vacuum source. "Hepafilter" refers to a filter which removes substantially all airborne particles having a particle diameter of greater than 0.3 microns. During asbestos removal, the air within the sealed enclosure is sampled on a regular basis to determine the density of airborne particles within predetermined ranges. Workers within the enclosure are required to wear approved protection gear having a hierarchy based upon the airborne particles within the building enclosure. In order to reduce costs associated with the more expensive protection gear, most contractors attempt to reduce airborne particle concentrations within the enclosed ACM removal area to a minimum, typically by providing a replenishing air flow which replaces the air within the enclosure on the order of four times per hour.

In order to prevent asbestos particles contained on the workers clothing and body from entering the atmosphere outside of the enclosed area, a triple air lock is typically provided at the entrance to the enclosed area. In the first area of the triple air lock positioned adjacent to the enclosed area, workers remove their protective gear and clothing, generally depositing it in sealed receptacles which are later removed from the area and cleaned or destroyed. After disrobing, a worker enters an intermediate area of the triple air lock which contains a shower. Each worker showers in this area and then progresses to the third area of the triple air lock in which clean clothes, etc., are provided. The water from the intermediate air lock shower is filtered to a particle size permissible for discharge into the surrounding sewer system, or ground water environment, typically 5 microns. In some cases, water which has been vacuumed from the floor of the enclosed ACM removal area by wet-vacuum in the final stages of cleanup is dumped into the worker's shower for filtering by the shower filter system. However, in most cases, the wet-vacuum container contains enough large ACM particles to prevent use of the shower as a filtering system, in which case all of the water and particles contained in the wet-vacuum are transferred to a barrel or other sealed receptacle for removal to an approved disposal site or for subsequent filtering. Due to the labor, dump fees, and inconvenience associated with removing large quantities of contaminated water to an asbestos disposal site, the use of water in ACM removal is minimized. Generally, blast spray water, when used at all, is applied at relatively high pressures, e.g. 5,000 psig or more, to decrease the total volume of water needed in any blast spray removal operations. The use of large amounts of water also damages underlying building structure such as floors and ceilings and has thus also been minimized to prevent unnecessary damage to the building.

OBJECTS OF THE INVENTION

It is an object of the present invention to provide an ACM removal system which eliminates much of the hand labor associated with ACM removal.

It is another object of the present invention to provide an ACM removal system which is more cost-efficient than current ACM removal methods.

It is another object of the present invention to provide an ACM removal system which is relatively faster than current ACM removal methods.

It is another object of the present invention to provide an ACM removal system which enables the use of relatively lower blast water pressure than that currently used in the industry.

It is another object of the present invention to provide an ACM removal system which utilizes a relatively large volume of water flow for the removal and handling of ACM.

It is another object of the present invention to provide an ACM removal system which reduces the density of airborne particles created during ACM removal as compared to current methods.

It is another object of the present invention to provide an ACM removal system which eliminates the need for a negative pressure environment in the building enclosure in which ACM removal is taking place.

It is another object of the present invention to provide an ACM removal system which provides a continuous process in which ACM is removed from a building in slurry form and in which blast water is coarsely removed from the ACM slurry and reused for further ACM removal and in which the blast water is more finely removed from the ACM slurry and discharged into the local municipal sewer at the completion of ACM removal whereby the necessity of disposing of large quantities of waste water at an approved ACM dump site is eliminated.

It is another object of the present invention to provide an ACM removal system which utilizes a mobile housing unit which encloses a blast spray and which serves as an initial collection area for ACM and waste blast spray.

It is another object of the present invention to provide an ACM removal system which utilizes a mobile housing unit which provides a localized enclosure in an specific region of a building in which ACM removal is taking place to prevent propagation of water overspray and ACM particles into the surrounding environment.

SUMMARY OF THE INVENTION

The present invention may include an ACM removal assembly comprising: nozzle means for directing a pressurized fluid against ACM which is supported on a building structure for dislodging the ACM; pressurized fluid supply means operably connected to said nozzle means for supplying fluid under pressure thereto; and housing means for supporting said nozzle means therein and for capturingly receiving spent fluid and dislodged ACM.

The present invention may also include a method for removing ACM from a building structure comprising: sealingly circumscribing a first building region having exposed ACM with an ACM containment apparatus; removing ACM from the circumscribed building region with a fluid spray blast; combiningly capturing dislodged ACM and spent fluid from the spray blast in the containment apparatus; separating a portion of the ACM from the combined ACM and spent fluid; and reusing the coarsely separated fluid to remove ACM from a second building region.

The present invention may also include an ACM removal assembly comprising: nozzle means for directing a pressurized fluid against ACM which is supported on a building structure for dislodging the ACM; pressurized fluid supply means operably connected to said nozzle means for supplying fluid under pressure thereto; housing means for supporting said nozzle means therein and for capturingly receiving spent fluid and dislodged ACM; and material handing and separating means operably connected to said housing means for receiving combined spent fluid and dislodged ACM from said housing means for separating said spent fluid from said dislodged ACM; said material handling and separating means comprising coarse separating means for coarsely separating said spent fluid from said dislodged ACM and fluid return means for returning coarsely separated fluid to said pressurized fluid supply means; said material handling and separating means comprising fine separating means for receiving coarsely separated fluid from said coarse separating means and for finely separating ACM therefrom.

BRIEF DESCRIPTION OF THE DRAWINGS

An illustrative and presently preferred embodiment of the invention is shown in the accompanying drawings in which.

DETAILED DESCRIPTION OF THE INVENTION

Figure 1:
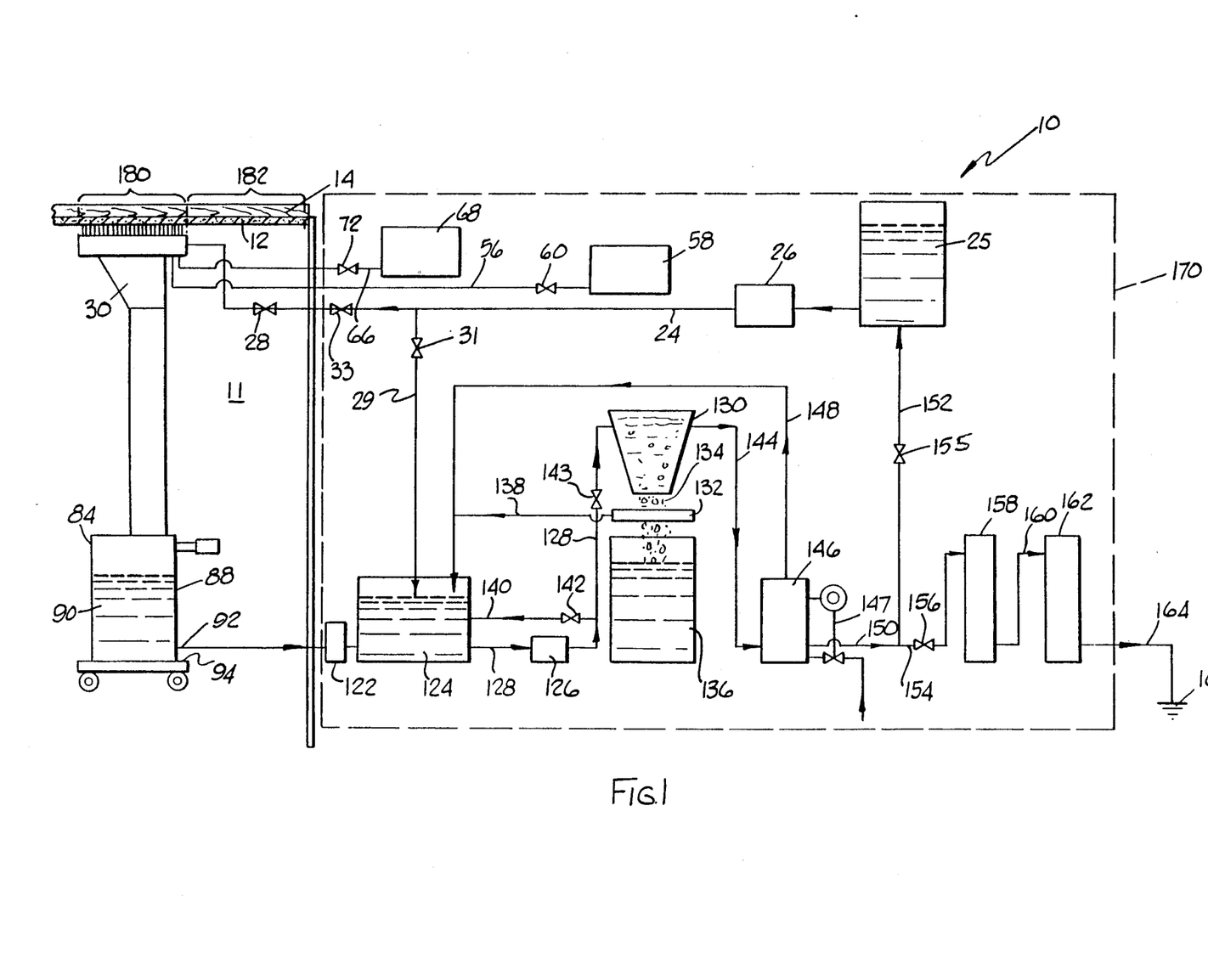
FIG. 1 is a schematic illustration of an ACM removal system.

FIG. 1 schematically illustrates an ACM (asbestos-containing material) removal assembly 10 which is adapted to remove ACM 12 from supporting building structure 14. The ACM removal assembly in general comprises nozzle means 16, 18, 20, FIGS. 3 and 4, for directing a spray of pressurized fluid 15 such as water against ACM 12 for dislodging it. The nozzle means 16, 18, 20 are operably connected to pressurized fluid supply means 25, FIG. 1, which supplies fluid under pressure thereto. The nozzle means 16, 18, 20 are supported within housing means 30 which is adapted for capturingly receiving spent fluid 21 and dislodged ACM 13, FIG. 4. Material handling and separating means 84, 124, 130, 146, 158, 162, etc., are operably connected to the housing means 30 for receiving combined spent fluid and dislodged ACM from the housing means 30 for separating the spent fluid 21 from the dislodged ACM 13. The material handling and separating means includes coarse separating means 130, 146, etc., for coarsely separating the spent fluid from the dislodged ACM, and fluid return means 150, 152, etc., for returning coarsely separated fluid to the pressurized fluid supply means 25. The material handling and separating means also comprises fine separating means 158, 162, etc., which is typically used only at the end of an ACM removal job. The fine separating means is adapted for receiving coarsely separated fluid from the coarse separating means 130, 146, etc., for finely separating ACM from the coarsely separated fluid to provide a finely filtered fluid which is sufficiently filtered to be discharged into the local sewage system or local earth/water environment. A negative air pressure may be provided within the housing means 30 and sealing devices, e.g. 46, 52, 62, may be provided in associated with the housing to prevent fluid overspray and contamination of the air within the building enclosure with ACM airborne particles. The housing assembly 30 may be mounted on a wheeled carriage 94 or the like to facilitate movement of the housing assembly 30 and associated spray nozzle 16, 18, 20 to selected areas within the building from which ACM is to be removed. Having thus described the ACM removal assembly 10 in general, various specific features of the assembly will now be described in further detail.

Figure 3:
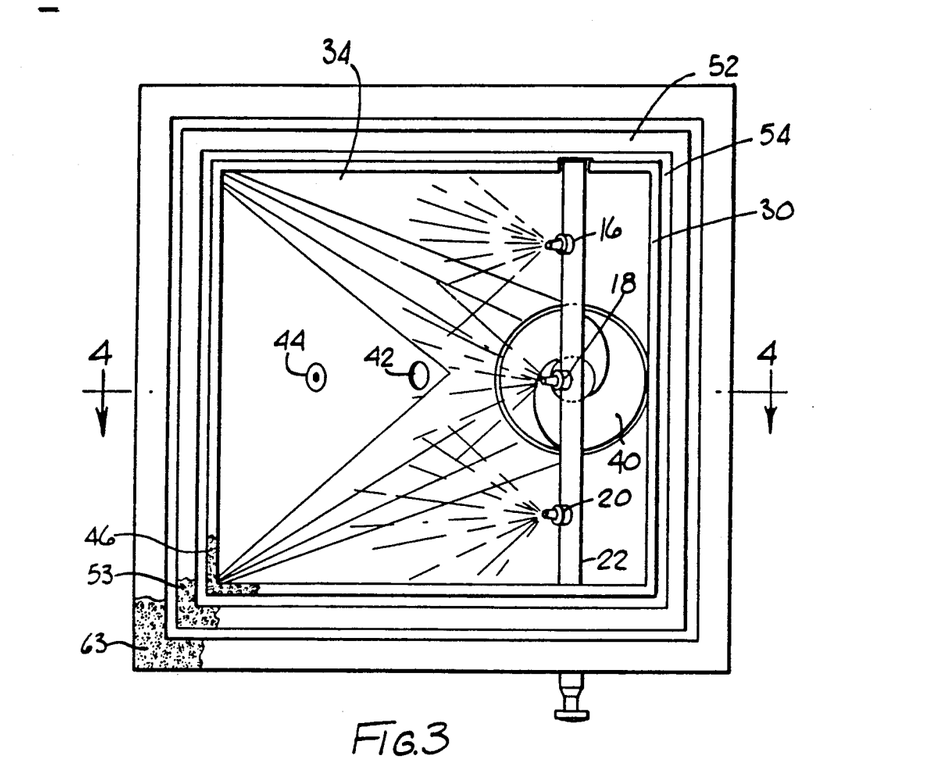
FIG. 3 is a top plan view of a nozzle assembly and housing unit.
Figure 4:
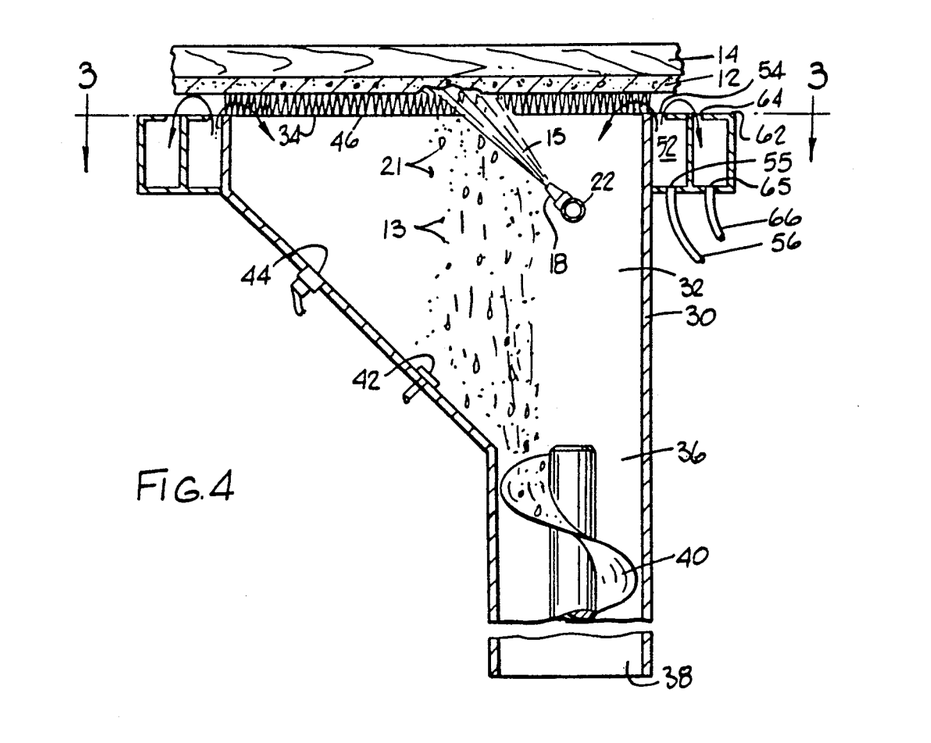
FIG. 4 is a cross sectional elevation view of a nozzle assembly and housing unit.

As illustrated in FIGS. 3 and 4, a plurality of spray nozzles (e.g. three spray nozzles, 16, 18, 20, which may be conventional washjet cleaning nozzles such as that sold under model designation 6504 ¼ MEG by Spraying Systems Company of North Avenue, Wheaton, Ill., 60188) are mounted on a spray nozzle conduit 22 which may be, e.g., a ¾-inch circular pipe. Spray nozzle conduit 22 is capped at one end thereof and is connected at the other end thereof to a water line 24 which is connected to a water supply reservoir 25. Reservoir 25 may be, e.g., a 50-gallon supply reservoir. A water pump 26 is operably mounted in water line 24. The pump power rating, e.g. 15 h.p., is matched to the water requirements of the spray nozzle. In a preferred embodiment, the nozzles are adapted to apply water at a pressure up to 5000 psi and preferably are operated in a range from 1000–2000 psi. The flow rate requirements of the nozzles are typically up to 10 gallons per minute each and are preferably operated in a range of 2–5 gallons per minute each. As illustrated in FIG. 1, a signal-actuated control valve 28 may be provided in the water line 24 for shutting off the supply of water from the water supply reservoir 25 in response to a control signal, as further described below. A branch line 29 connected to line 24 is adapted for use in removing water from reservoir 25 at the completion of an ACM removal job is also described below. Flow of water into line 29 may be controlled by operation of conventional control values 31 and 33 located in lines 29 and 24, respectively.

Figure 2:
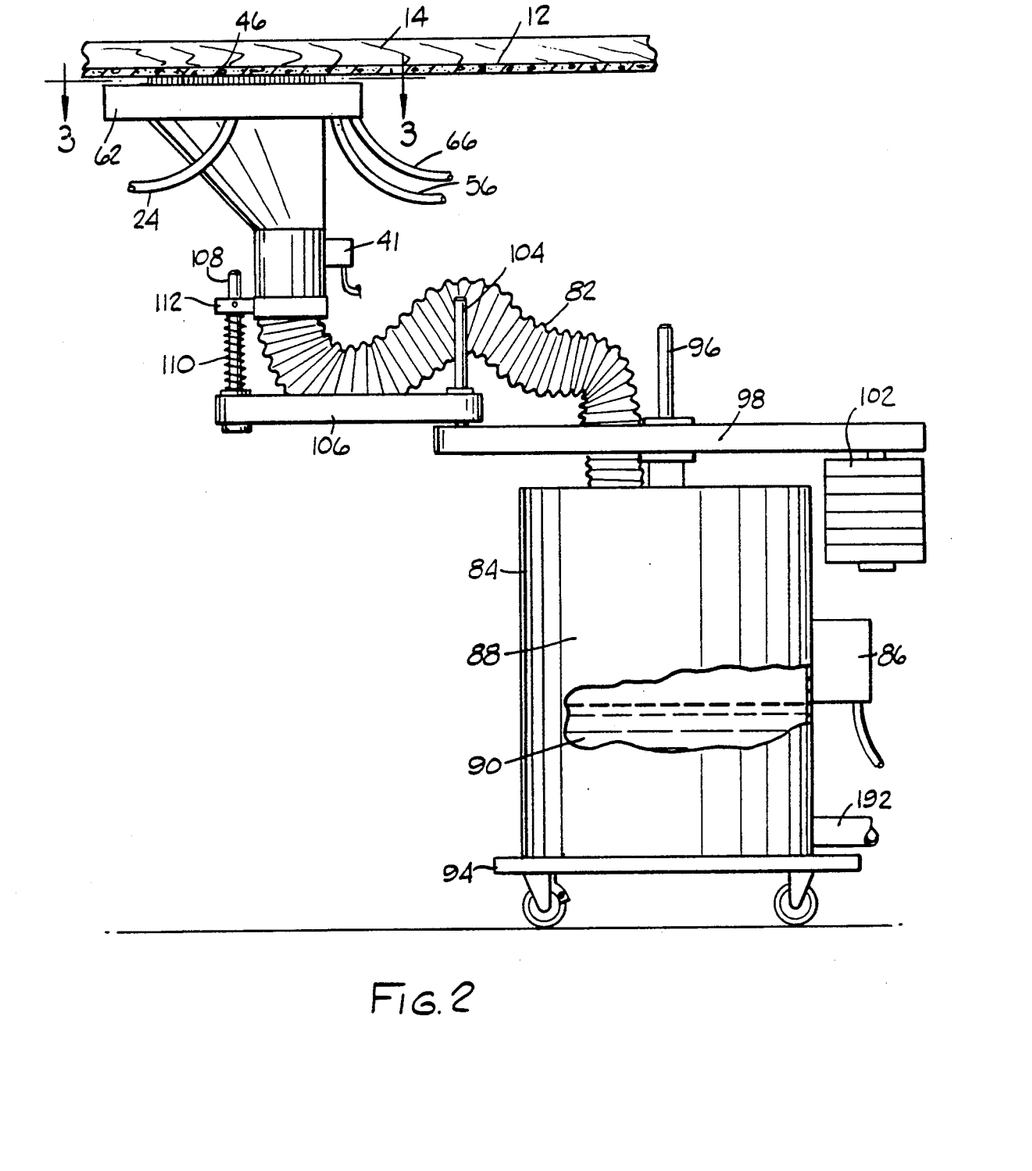
FIG. 2 is an elevation view of a portion of an ACM removal system engaged with a building structure ceiling area from which ACM is to be removed.

Housing 30, as best illustrated by FIGS. 2–4, comprises an enlarged upper end portion 32 terminating in a square, upper opening 34, which may have an open area of, e.g., 1 square foot. The enlarged upper end portion may have an inverted, irregular pyramid-type shape. The spray nozzle conduit 22 is supported on two sidewalls of the enlarged upper end portion 32 through appropriately-sized bores therein. The spray nozzle conduit 22 may be positioned, e.g., 2–4 inches below the upper edge of opening 34. The centerline of each spray blast from nozzle 16, 18, 20 may be adjustable and may be inclined, e.g., 45° with respect to the upper periphery of opening 34. The housing 30 also comprises a restricted lower end portion 36 which is integrally formed with the upper end portion 32 and which terminates in a lower opening 38 which may be circular in shape and which may have an opening area of, e.g., 0.02 square feet. In one embodiment of the invention, dislodged ACM and spent fluid 13 is capturingly received in the housing upper end portion 32 and is discharged by gravity through the restricted lower end portion 36. In another embodiment of the invention, as illustrated in FIG. 4, conveying means such as an auger 40 are provided in the lower end portion 36 to facilitate removal of ACM and spent fluid from the housing 30. The auger 40 may be conventionally mounted within the housing and may be powered by a conventional auger motor 41, FIG. 2.

As illustrated in FIGS. 3 and 4, a vacuum monitoring gauge 42 is provided in the housing for monitoring the pressure therein. The vacuum monitoring gauge 42 may be operably connected with water line shutoff valve 28 for terminating the supply of water to spray nozzle 22 in the event that the pressure within the housing 30 rises above a predetermined negative air pressure value, e.g. above −0.5 psig.

A conventional blowoff valve 44 provided with a hepafilter, which may be set at, e.g., 1.0 psig, is provided as a safety device for relieving positive pressure within housing 30 in the event of system malfunction.

A bristle brush-type seal 46 is provided about the periphery of opening 34 by a plurality of closely-spaced brush bristles which may each have a length of, e.g., 1.0 inches. The bristle seal is adapted to allow inflow of air therethrough while restricting nozzle overspray and restricting discharge of ACM particles into the surrounding atmosphere.

A pressure ring 52 which circumscribes the upper housing opening 34 may be fixedly mounted on the housing 30, as illustrated in FIGS. 3 and 4. Pressure ring 52 may have an annular opening 54 at an upper end. Pressurized air is sent to pressure ring 52 through at least one inlet opening 55 which may be provided in a lower portion thereof. The inlet opening is placed in fluid communication with a pressurized air source such as air compressor 58 through a pressure hose 56. Compressor 58 may be located inside or outside of the building enclosure 11. A conventional shutoff valve 60 may be provided in the pressure hose 56 for terminating air flow from the air source 58. The pressurized air source may provided air at a pressure of, e.g., 2.0 psig to pressure ring 52 at a flow rate of, e.g., 50 cfm.

As best illustrated by FIGS. 2–4, a vacuum ring 62 may be mounted on the pressure ring 52 in circumscribing relationship therewith. The vacuum ring 62 comprises an annular opening 64 in an upper end portion thereof. Vacuum ring 62 is placed under negative pressure, e.g. −0.9 psig, by a vacuum source 68 which communicates with the vacuum ring 62 through vacuum hose 66 and vacuum ring inlet opening 65. A vacuum shutoff valve 72 may be provided in association with the vacuum source 68 to terminate air flow thereto. The vacuum source 68 may be a conventional vacuum pump provided with hepafilters for filtering the air discharged therefrom down to a particle size of less than 0.3 microns in diameter. The airflow rate through vacuum ring 62 may be, e.g., 50 cfm. Alternatively, vacuum ring 62 may be placed under vacuum by the vacuum pump associated with the wet/dry vacuum assembly 84 described below.

Second and third annular bristle seals 53, 63 similar in construction and use to annular bristle seal 46 may be provided in association with annular pressure ring 52 and annular vacuum ring 62, respectively, as shown partially in FIG. 3. As best illustrated by FIG. 2, the lower opening 38 of housing 30 communicates with a wet/dry hepavacuum assembly 84 through a flexible conduit 82 which is connected to housing 30 and to the vacuum pump 86 by appropriate adapters. In one embodiment of the invention, the flexible conduit comprises a diameter of approximately 2.0 inches an the wet/dry vacuum assembly comprises a tank 88 having a capacity of 30 gallons. The wet/dry vacuum assembly may have a vacuum pump 86 capable of providing a negative pressure of approximately −3.6 psig within housing 30. The wet/dry vacuum assembly 84 may be a conventional wet/dry vacuum assembly such as are used at most construction sites and maintenance shops, e.g. that manufactured under the product designation 2HP Wet/Dry Hepavac by Control Resource Systems, Inc., 670 Mariner Drive, Michigan City, Ind., 46360. The wet/dry vacuum assembly is adapted to collect an unprocessed slurry of water and ACM in tank 88 thereof. A second flexible conduit 92 is connected to tank 88 at an opening in the bottom thereof and is connected at an opposite end to material handling and separating means as described in further detail below.

In one preferred embodiment of the invention, the wet/dry vacuum assembly 84 is mounted on a wheeled carriage assembly 94 and the housing 30 is mounted on a pivot assembly 96 which is, in turn, supported on the wet/dry vacuum assembly and wheeled carriage assembly. The pivot assembly 96 may comprise a first pivot arm 98 mounted on top of tank 88 and having a counterweight 102 supported at one end thereof and a second pivot assembly 104 mounted at the other end thereof. A second pivot arm 106 is mounted on the second pivot assembly at one end thereof and a third pivot arm assembly 108 is mounted at the other end of the second pivot arm 106. A biasing spring 110 is mounted in circumscribing relationship about the third pivot arm assembly 108 between the second pivot arm 106 and a collar assembly 112. The collar assembly 112, in turn, supports the housing 30 thereon. Biasing spring 110 is adapted to urge the collar assembly 112 and housing 30 upwardly so as to urge bristle seal 46 against a building region from which ACM is to be removed.

As illustrated by FIG. 1, flexible conduit 92 places wet/dry vacuum tank 88 in fluid communication with a slurry holding tank 124. A pump 122, which may be located inside or outside of enclosure 11, having a capacity at least as great, and preferably about twice as great, as the capacity of blast water supply pump 26 is adapted to pump slurry from tank 88 to slurry holding tank 124. Slurry holding tank 124 may have a capacity of 200 gallons.

A pump 126 operably mounted in a slurry line 128 is adapted to pump slurry from slurry holding tank 124 to a first separator device 130 such as a conventional dewatering separator, which may be a Lakos AXL series AXL-0100-B dewatering separator manufactured by Lakos Separators U.S.A (a division of Claude Laval Corp.), 1911 North Helm Avenue, P.O. Box 6119, Fresno, Calif., 93703-0119. Such a separator device 130 typically removes ACM particles having a diameter of greater than 74 microns. The separator device 130 discharges separated ACM particles 134 to an ACM collection tank 136 and discharges initially separated slurry through slurry line 144. The discharged ACM particles 134 may be further dewatered to remove fluid bulk therefrom as by a dewatering screen 132 which may be a conventional dewatering screen such as that sold under model designation Hydroscreen model HS-18 by Hycor Corp., 29850 North Hwy. 41, Lake Bluff, Ill., 60044. Fluid from the dewatering screen may be discharged through fluid line 138 back into slurry holding tank 124. As further illustrated by FIG. 1, slurry line 128 may be connected to a feedback line 140 controlled by a control valve 142. A control valve 143 may also be proVided in line 128 at the inlet to separator 130. Valves 142 and 143 may be selectively operated to control the flow rate of slurry to separator device 130.

The initially separated slurry discharged from separator 130 may be further refined as by a coarse filter device 146. Coarse filter device 146 may comprise a device which filters the slurry down to a maximum particle size which is acceptable for use in blast spray water, e.g. a size of approximately 300 microns in diameter and may comprise an automatic backflush-type strainer such as that sold under the product designation model type WJR filter 15 manufactured by R. P. Adams Co., 225 East Park Drive, Buffalo, N.Y., 14240-0963. Such a filter device includes a backflush assembly 147 which enables backflush cleaning of filter 146 and discharge of the backflush material through backflush line 148 into slurry holding tank 124. Coarse filter device 146 discharges coarsely refined slurry through lines 150 and 152 to water supply reservoir 125 in one operating state of the ACM removal assembly 10 in which a control valve 156 in a connected branch line 154 is closed and a control valve 155 in line 152 is open. In a second operating state of the ACM removal assembly, control valve 15 in branch line 154 is opened and control valve 155 in branch line 152 is closed. In this second operating state, the coarsely separated slurry is directed through first fine filter unit 158, line 160, and second fine filter unit 162 to provide a finely separated slurry which is discharged through line 164 into local municipal sewer drain 166 or the local earth/water environment. Fine filter units 158 and 162 are adapted to filter out particles down to a size which are suitable for discharge into the environment. Current regulations typically specify this particle size to be on the order of 5 microns. In one specific embodiment of the invention, filter 158 comprises a Stranrite UF-180 filter unit manufactured by Stranrite Company of 190 Wallace Street, New Haven, Conn., 06513. Unit 158 is equipped with a 100-micron filter screen. Unit 162 may be identical to unit 158 except that it is equipped with a 5-micron filter screen.

In one preferred embodiment of the invention, slurry pump 122, slurry holding tank 124, slurry pump 126, separator device 130, dewatering device 132, asbestos holding tank 136, coarse filter device 146, fine filter units 158, 162, reservoir 25, spray water pump 26, air compressor 58, and vacuum pump 68 are all positioned externally of a building enclosure 11 from which asbestos-containing material is to be removed. Each of these components may be mounted in a unitary transport device 170 such as, for example, a truck trailer or the like, which may be conveniently pulled alongside a building from which ACM is to be removed.

In operation, carriage 94 which supports housing assembly 30 and wet/dry vacuum unit 84 is moved to a selected building region, e.g. 180, from which exposed ACM is to be removed. An operator appropriately adjusts the position and elevation of pivot assemblies 96, 104, 110, etc., so as to urge the upper housing opening into sealing relationship with the selected building region. This is typically accomplished by compressing the bristles in bristle seal ring 46 slightly, e.g. 20%, against the exposed ACM 12. Next, a fluid spray blast from nozzles 16, 18, 20 is directed against the circumscribed ACM as the housing assembly 30 is slowly moved across the ceiling, preferably in a straight-line path in a series of sweeps in much the same manner, for example, that one would mow a lawn. The spray blast is provided through actuation of pump 26 such as by actuation of an electric motor associated therewith (not shown) or appropriate valves (not shown) associated therewith. As ACM is dislodged by the spray blast, it falls into housing 30 which is positioned immediately therebelow and is channeled downwardly therethrough by gravity and/or associated conveying device 40. Spent fluid from nozzles 16, 18, 20 is also captured in housing 30 and flows downwardly therethrough.

Before or simultaneously with the discharge of spray through nozzles 16, 18, 20, wet/dry vacuum assembly 84 is actuated to draw dislodged ACM and spent fluid from nozzles 16, 18, 20 into tank 88. An ACM slurry 90 is thus collected in tank 88 which is preferably removed therefrom in periodic intervals through use of pump 122. Pump 122 may be actuated manually or may be actuated automatically as by float valves or the like (not shown) provided in tank 88. Slurry 90 is pumped to holding tank 124 which is preferably located outside of building enclosure 11. Pump motor 126, which may also be operated either manually or through appropriate float valves or the like within tank 124, pumps slurry from tank 124 to separator device 130. Separator device 130 initially separates relatively large ACM particles 134 from a slurry which is discharged therefrom through line 144. Particles 134 are further separated from fluid clinging thereto by a dewatering unit 132 which returns the fluid thus separated from the particles to tank 124. The inflow of slurry to separator 130 may be controlled through control of valves 142 and 143 to enable continuous operation of pump 126 rather than intermittant operation thereof. Operation of control valves 142, 143 may be performed manually or through the use of float gauges (not shown) associated with tank 124, etc. Asbestos particles 134 are collected in container 136 which may be periodically sealed and removed from below units 134 and 132 or discharge to another sealable container. The initially refined slurry discharged from separator device 130 is filtered in coarse filter device 146 which discharges a coarsely filtered slurry into line 150. Line 150 communicates with branch lines 152 and 154. During normal operation of the spray blast for removal of ACM, control valve 155 in line 152 is open and control valve 156 in line 154 is closed. Thus, the coarsely separated slurry from line 150 passes through line 152 and returns to fluid reservoir 25 and is thus reused by the system to removingly blast ACM 12 from supporting building structure 14, for example, at a second building location 182. At the completion of the ACM spray blasting removal operation, the flow of water to nozzles 16, 18, 20 is terminated by closing control valve 33, and control valve 31 is simultaneously opened to enable pumping of water from reservoir 25 directly into slurry holding tank 124. After fluid flow to nozzles 16, 18, 20 has been terminated, motor 122 continues to operate until all of the slurry 90 in wet/dry vacuum tank 88 has been pumped to slurry holding tank 124. Approximately simultaneously with the closure of valve 33, valve 155 is closed and valve 156 is opened, thus allowing all of the coarsely separated slurry in line 150 to be directed through filter units 158, 162. The finely separated slurry discharged from fine filter 162 is typically discharged into a municipal sewer system. The collected ACM particles in collection tank 136 are appropriately sealingly enclosed, for example, in plastic bags, sealed containers or the like, and removed to appropriate ACM disposal sites.

During operation of spray nozzles 16, 18, 22, air provided under pressure to pressure ring 52 is discharged through outlet 54 to provide an encompassing inward air flow through bristle ring 46 which acts to prevent discharge of overspray or ACM particles through bristle seal 46. At the same time, a vacuum is also applied to vacuum ring 62 which provides a flow of air from pressure ring opening 54 to vacuum ring opening 64 which tends to capture any overspray or particles which may have initially escaped through bristle seal 46. Thus, the inward air flow through bristle seal 46 which is provided by the vacuum developed by wet/dry vacuum assembly 84 is further enhanced by pressurized air flow from pressure ring 52, and any escaping particles from the bristle seal which are not redirected through the bristle seal back into housing 30 are carried by the air flow from pressure ring 52 into outer vacuum ring 62. Further pressure rings (not shown) and further vacuum rings (not shown) may also be provided in alternating concentric relationship with rings 52 and 62 to provide further annular air seals to further prevent overspray and particle discharge into the atmosphere surrounding housing 30.

Although a housing having a horizontally disposed top opening with square-shaped opening configuration has been described for removal of ACM from a ceiling region of a building, it will be appreciated that housing openings having various other configurations may be provided for engaging different ACM-covered surfaces of a building. For example, an arcuate, vertically disposed housing opening (not shown) could be provided for removing ACM from cylindrical pipes, wedge-shaped housing openings (not shown) could be provided for removing ACM from corner regions of walls and ceilings, etc. It will also be appreciated that multiple housing units might be employed and associated with a single or multiple collection vacuum sources, and such housing units might be mounted on various different types of portable assemblies which may be hand-carried assemblies as well as carriage-type assemblies, etc.

Thus, while an illustrative and presently preferred embodiment of the invention has been described in detail herein, it is to be understood that the inventive concepts may be otherwise variously embodied and employed and that the appended claims are intended to be construed to include such variations except insofar as limited by the prior art.

What is claimed is:

1. An ACM removal assembly comprising:
   (a) nozzle means for directing a pressurized fluid against ACM which is supported on a building structure for dislodging the ACM;
   (b) pressurized fluid supply means operably connected to said nozzle means for supplying fluid under pressure thereto;
   (c) housing means for supporting said nozzle means therein and for capturingly receiving spent fluid and dislodged ACM; and
   (d) flexible mechanical seal means for forming a seal at an interface between said housing and a building region from which ACM is to be removed for inhibiting discharge of waste fluid and dislodged ACM into the environment outside said housing means, said flexible mechanical seal means being displaceable across the surface of said interfacing building region without disrupting said seal between said housing means and the interfacing building region.

2. The invention of claim 1, said housing means comprising a first opening therein, said flexible mechanical seal means comprising flexible bristles mounted about the periphery of said first opening in said housing means.

3. The invention of claim 2 further comprising:
   first vacuum means operatively connected with said housing means for producing a below atmospheric air pressure therein whereby an inwardly directed airflow is provided about the periphery of said first opening means; said inwardly directed peripheral airflow passing through said bristles mounted about said first opening whereby fluid overspray from said nozzle means is directed inwardly by said inward peripheral airflow.

4. An ACM removal assembly comprising:
   (a) nozzle means for directing a pressurized fluid against ACM which is supported on a building structure for dislodging the ACM;

(b) pressurized fluid supply means operably connected to said nozzle means for supplying fluid under pressure thereto;
(c) housing means for supporting said nozzle means therein and for capturingly receiving spent fluid and dislodged ACM;
(d) flexible mechanical seal means for forming a seal at an interface between said housing and a building region from which ACM is to be removed for inhibiting discharge of waste fluid and dislodged ACM into the environment outside said housing means, said flexible mechanical seal means being displaceable across the surface of said interfacing building region without disrupting said seal between said housing means and the interfacing building region, said housing means comprising a first opening therein, said flexible mechanical seal means comprising flexible bristles mounted about the periphery of said first opening in said housing means;
(e) first vacuum means operatively connected with said housing means for producing a below atmospheric air pressure therein whereby an inwardly directed airflow is provided about the periphery of said first opening means; said inwardly directed peripheral airflow passing through said bristles mounted about said first opening whereby fluid overspray from said nozzle means is directed inwardly by said inward peripheral airflow; and
(f) first annular air seal means for facilitating recapture of overspray from said nozzle means which penetrates said mechanical seal means comprising positive pressure air supply means positioned in circumscribing relationship about said housing means first opening.

5. The invention of claim 4 further comprising:
second annular air seal means for facilitating recapture of overspray from said nozzle means penetrating said mechanical seal means and said first annular air seal means, said second annular air seal means comprising second vacuum means positioned in circumscribing relationship about said first annular air seal means.

6. An ACM removal assembly comprising:
(a) nozzle means for directing a pressurized fluid against ACM which is supported on a building structure for dislodging the ACM;
(b) pressurized fluid supply means operably connected to said nozzle means for supplying fluid under pressure thereto;
(c) housing means for supporting said nozzle means therein and for capturingly receiving spent fluid and dislodged ACM;
(d) flexible mechanical seal means for forming a seal at an interface between said housing and a building region from which ACM is to be removed for inhibiting discharge of waste fluid and dislodged ACM into the environment outside said housing means, said flexible mechanical seal means being displaceable across the surface of said interfacing building region without disrupting said seal between said housing means and the interfacing building region, said housing means comprising a first opening therein, said flexible mechanical seal means comprising flexible bristles mounted about the periphery of said first opening in said housing means;
(e) first vacuum means operatively connected with said housing means for producing a below atmospheric air pressure therein whereby an inwardly directed airflow is provided about the periphery of said first opening means; said inwardly directed peripheral airflow passing through said bristles mounted about said first opening whereby fluid overspray from said nozzle means is directed inwardly by said inward peripheral airflow;
(f) first vacuum monitor means operatively associated with said housing means for monitoring the relative air pressure therein and for generating a control signal indicative thereof; and
(g) shutoff valve means operatively associated with said nozzle means and response to said monitor means control signal for terminating the flow of fluid to said nozzle means in response to the air pressure in said housing means reaching a predetermined value.

7. The invention of claim 6 further comprising blowoff valve means operatively associated with said housing means for releasing pressure within said housing means at a predetermined pressure value.

8. The invention of claim 1 further comprising housing support means for supporting said housing means, comprising:
(a) biasing means for axially urging said housing means toward the building region from which ACM is to be removed for maintaining a seal thereagainst;
(b) lateral displacement means for laterally displacing said housing means relative a building region from which ACM has been removed and toward a building region from which material is to be removed.

9. An ACM removal assembly comprising:
nozzle means for directing a pressurized fluid against ACM which is supported on a building structure for dislodging the ACM;
pressurized fluid supply means operably connected to said nozzle means for supplying fluid under pressure thereto;
housing means for supporting said nozzle means therein and for capturingly receiving spent fluid and dislodged ACM; and
material handing and separating means operably connected to said housing means for receiving combined spent fluid and dislodged ACM from said housing means for separating said spent fluid from said dislodged ACM, said material handling and separating means comprising:
(a) first ACM removal means for removing ACM particles larger than a predetermined first particle size from said combined ACM and spent fluid and for discharging a coarsely refined ACM slurry;
(b) valve means in fluid communication with said first ACM removal means for directing said coarsely refined ACM slurry to said pressurized fluid supply means during a first operating state thereof and for directing said coarsely refined ACM slurry to a second ACM removal means during a second operating state thereof;
(c) second ACM removal means for receiving said coarsely refined ACM slurry and for removing ACM particles larger than a second predetermined particle size from said coarsely refined ACM slurry and for discharging a finely refined ACM slurry therefrom; and (d) drain means for receiving said finely refined ACM slurry and for discharging said finely refined ACM slurry into the local sewer system.

10. An ACM removal assembly comprising:
    (a) nozzle means for directing a pressurized liquid against ACM which is supported on a building structure for dislodging the ACM;
    (b) pressurized liquid supply means operably connected to said nozzle means for supplying liquid under pressure thereto;
    (c) housing means for supporting said nozzle means therein and for capturingly receiving spent liquid and dislodged ACM; and
    (d) material handing and separating means operably connected to said housing means for receiving combined spent liquid and dislodged ACM from said housing means for separating said spent liquid from said dislodged ACM; said material handling and separating means comprising coarse separating means for coarsely separating said spent liquid from said dislodged ACM and liquid return means for returning coarsely separated liquid to said pressurized liquid supply means whereby said coarsely separated liquid is supplied to said nozzle means.

11. The invention of claim 10, said material handling and separating means comprising fine separating means for receiving coarsely separated liquid from said coarse separating means and for finely separating ACM therefrom.

12. An ACM removal assembly comprising:
    (a) slurry forming means for combiningly receiving liquid and dislodged ACM therein for forming an ACM slurry;
    (b) liquid supply means operably associated with said slurry forming means for supplying liquid thereto;
    (c) slurry transport means for transporting said ACM slurry from said slurry forming means to material handling and separating means;
    (d) material handing and separating means connected to said slurry transport means for receiving said ACM slurry from said slurry forming means for separating ACM from said slurry, comprising:
        (i) first ACM removal means for removing ACM particles larger than a predetermined first particle size from said ACM slurry for discharging a coarsely refined slurry;
        (ii) valve means in fluid communication with said first ACM removal means for directing said coarsely refined slurry to said liquid supply means during a first operating state thereof and for directing said coarsely refined slurry to a second ACM removal means during a second operating state thereof;
        (iii) second ACM removal means for receiving said coarsely refined ACM slurry and for removing ACM particles larger than a second predetermined particle size from said coarsely refined slurry and for discharging a finely refined ACM slurry therefrom; and
        (iv) drain means for receiving said finely refined slurry and for discharging said finely refined slurry into the local sewer system.

* * * * *